UNITED STATES PATENT OFFICE.

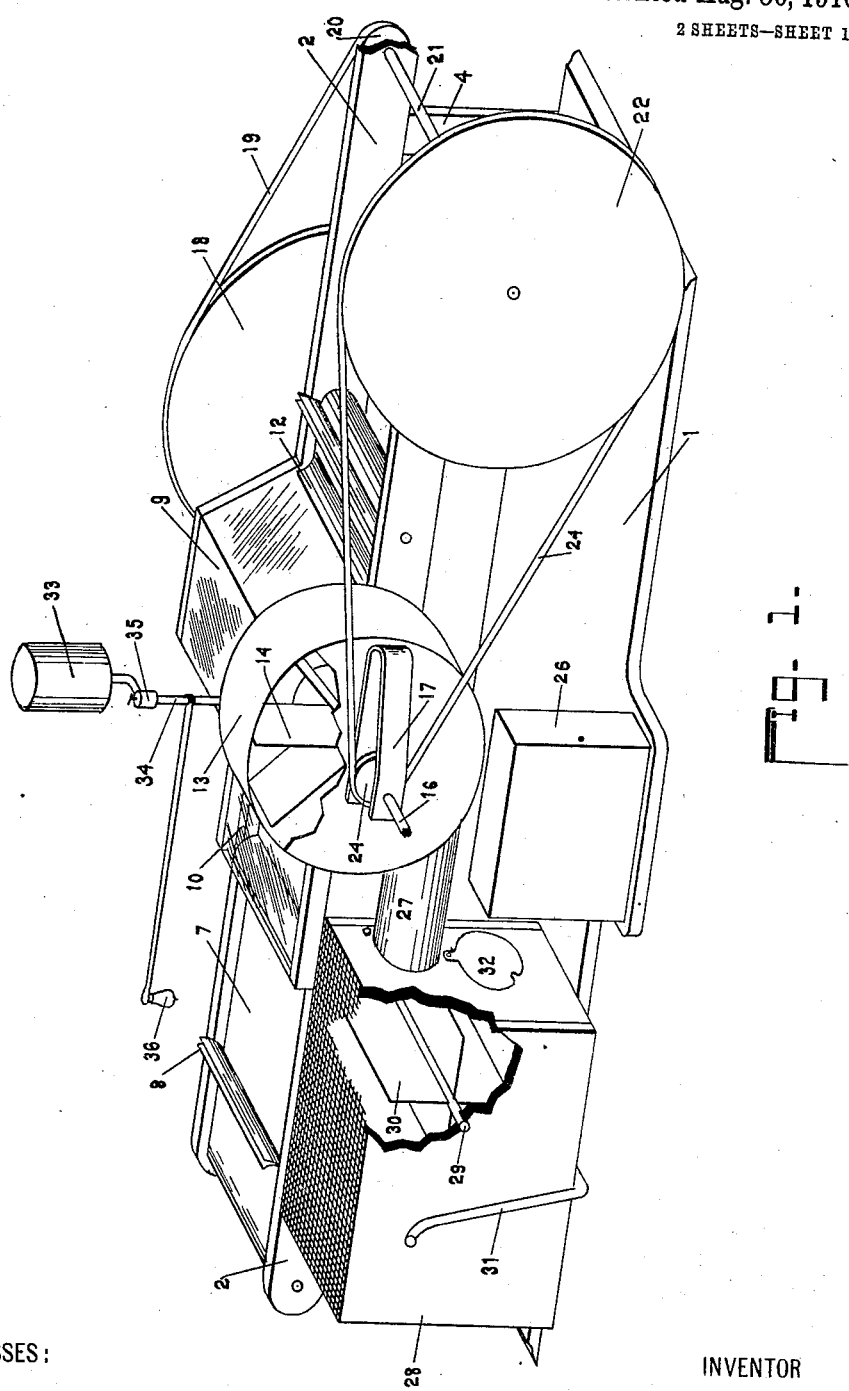

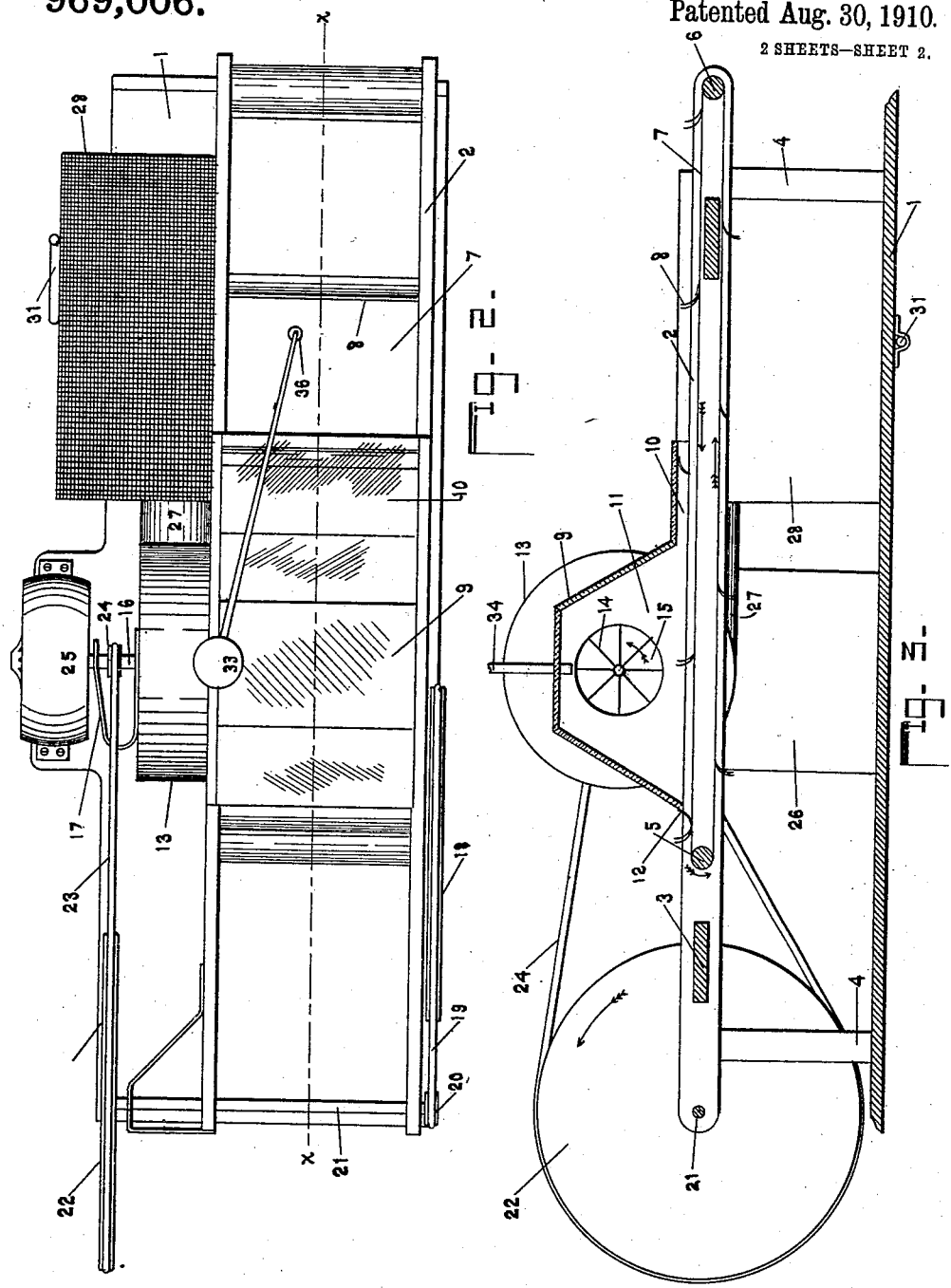

JESSE R. TRUELOVE, OF MARGARET, TEXAS.

MECHANICAL INSECT-DESTROYER.

969,006.	Specification of Letters Patent.	Patented Aug. 30, 1910.

Application filed August 16, 1909. Serial No. 512,946.

*To all whom it may concern:*

Be it known that I, JESSE R. TRUELOVE, a citizen of the United States, residing at Margaret, in the county of Foard and State of Texas, have invented certain new and useful Improvements in Mechanical Insect-Destroyers, of which the following is a specification.

My invention relates to new and useful improvements in mechanical insect destroyers, and more particularly to improvements in such devices, as are especially adapted for the destruction of house flies. Its object is to provide a mechanically operated device, which will attract, entrap, and destroy all flies and other insects in its immediate vicinity.

Another object is to provide an insect destroyer, which will employ a slowly moving endless belt, suitably baited, to convey the insects into an inclosure, and which will employ a suction fan to remove the insects from said inclosure, and eject them into a receptacle wherein means are provided for killing them.

A further object is to provide the insect destroyer with disinfectant means, to eliminate the danger of disease being spread by germs carried by the insects.

Finally, the object of the invention is to provide a device of the character described, that will be strong, durable, simple and efficient, and comparatively easy to produce, and also one in which the various parts will not be likely to get out of working order.

With these and various other objects in view, my invention has relation to certain novel features of construction and operation, an example of which is described in the following specification, and illustrated in the accompanying drawings, wherein:

Figure 1. is an isometric view of the insect destroyer, the operating means being omitted and portions of the fan casing and of the insect receptacle, being broken away to show the interior construction of these parts. Fig. 2. is a top view of the device, an electric motor being shown as the operating means. Fig. 3. is a longitudinal sectional elevation taken on the line *x—x* of Fig. 2, arrows being employed to show the direction of rotation of parts.

Referring now, more particularly to the drawings, wherein like numerals of reference designates similar parts, in all the figures, the numeral 1 denotes the supporting base of the device. Longitudinally of the base, there extends a frame work, consisting of a pair of parallel strips 2, connected by braces 3 at each extremity, and upheld by uprights 4. Rollers 5 and 6 are rotatably mounted between the strips 2 and are encircled by an endless belt 7, constructed of canvas, or other suitable, flexible material. At equal intervals upon this belt, projecting flaps 8 are attached, either singly or in pairs as shown in the drawings. These flaps will preferably be constructed of the same flexible material which forms the belt, and their purpose is made clear hereinafter.

At one extremity, the belt 6 passes beneath a housing 9, preferably of glass, and surmounted upon the strips 2. The transverse lower edges of this housing are closely adjacent to the belt, and a glass covered passage way 10 extends over the belt, from the lower edge of the housing which is first approached by the flaps 8 as the belt travels. The glass roof of the passage 10 is sufficiently adjacent to the belt, to cause the flaps 8 to contact therewith in passing through the passage way 10 thus forming a closure to the vacuum chamber 11 inclosed by the housing 9. A closure is provided to that side of the vacuum chamber from which the belt passes out, by means of a flexible flap 12 attached to the housing and contacting with the belt.

The casing 13 of a suction fan 14 is positioned at one extremity of the housing 9 and communicates with said housing through the air inlet 15. The fan is rigidly mounted upon the spindle 16, for which spindle an out-board bearing 17 is provided to the casing.

Upon the belt roller 5, a large pulley 18 is rigidly mounted, rotation being communicated to the same through an endless cord 19 from a small pulley 20 fast upon one end of a spindle 21. This spindle is rotatably mounted at one extremity of the strips 2, and carries upon its other end a large pulley 22. Rotation is communicated to the pulley 22 from the spindle 16, a small pulley 23, being fast upon the latter spindle and an endless cord 24, encircling the two pulleys. The spindle 16 is driven by the electric motor 25, for which a supporting pedestal 26 is provided.

The discharge pipe 27 of the suction fan opens into the insect receptacle 28 and the current of ejected air is intended to set into rotation the shaft 29 carrying a number of radial vanes 30 upon which the air impinges. The insect receptacle has a top formed of wire netting, and may be readily removed from the base 1, by turning the clamp 31 down at either side so as to clear the receptacle. A circular closure 32 is pivoted upon the end of the receptacle near the air inlet, and may be swung around to close said inlet when the receptacle is removed from the base. A tank 33 of liquid disinfectant empties into a feed pipe 34, which conducts the liquid into the vacuum chamber and discharges it adjacent to the inlet 15 of the fan.

Numeral 35 designates a sight feed glass controlled by a needle valve whereby the disinfectant matter may be fed into the vacuum chamber at any desired rate.

In the operation of the insect destroyer, the belt 7 is smeared with honey or syrup, causing flies and other insects to settle thereupon. To further attract insects, a light may be supported above the belt, as shown at 36 in the drawings. The speed communicated to the roller 5, is very much reduced from that of the driving spindle 16, so that the belt travels sufficiently slow to avoid disturbing the insects. The flaps 8 prevent the escape of any insects, which have been carried by the belt into the vacuum chamber, and the suction of the rapidly rotating fan 14 soon draws the insects through the air inlet 15, causing them to be ejected into the receptacle 28. Here they impinge violently upon the rotating vanes 30, with a force sufficient to kill them.

The drops of disinfectant matter as they fall in front of the fan inlet are caught by the rush of air and vaporized, so that any insects entering the inlet are disinfected by contact with the vapor. The vapor settles in the receptacle 28 further disinfecting the insects therein.

While the drawings show an electric motor as driving means for the described device, it is apparent that a spring motor or any other source of motive power is equally as applicable to the purpose.

What I claim, is:

1. In a device of the character described, the combination with a traveling belt and a frame supporting the same, of a housing covering a portion of said belt, a suction fan, the inlet of which communicates with the interior of the housing, a receptacle into which the outlet of said fan discharges, a plurality of vanes rotatably mounted upon a shaft, adapted to be rotated by the discharge from the fan, substantially as described, and means actuating the travel of the belt and the rotation of the fan.

2. In a device of the character described, the combination with a traveling belt, and a frame work in which the same is mounted, of a housing covering a portion of said belt, a suction fan, the inlet of which communicates with the interior of said housing, a receptacle into which the outlet of said fan discharges, a plurality of vanes rotatably mounted upon a shaft within said receptacle, adapted to be rotated by the discharge from the fan, means actuating the motion of belt and fan, and means whereby the insects caught are disinfected, substantially as described.

3. In a device of the character described, the combination with a frame work, of a traveling belt mounted therein, a housing covering a portion of the belt, a suction fan whose inlet communicates with the housing interior, a plurality of flaps upon the belt adapted to form closures to said housing, means adapted to attract insects to the belt, an inlet receptacle into which the fan discharges, means within said receptacle adapted to kill the insects ejected thereinto, substantially as described, and means actuating the travel of the belt and the rotation of the fan.

4. In a device of the character described, the combination with a supporting base, of a frame work mounted thereupon, a traveling belt mounted on said frame work, a housing covering a portion of said belt, a fan whose inlet communicates with the interior of said housing, means actuating the travel of the belt and the rotation of the fan, a plate extending from the housing over the belt adjacent thereto, a plurality of flexible flaps equidistantly spaced upon said belt, and adapted to contact with said plate extending from the housing and a removable receptacle into which the fan discharges, substantially as described.

5. In a device of the character described, the combination with a supporting base, of a frame mounted thereupon, a pair of rollers rotatable in said frame, a flexible belt mounted on said rollers, a housing covering a portion of said belt, a plate projecting from the lower portion of the housing over the belt, a plurality of flexible flaps equidistant upon said belt, adapted to contact with said projecting plate and thereby form closures to the housing interior, means whereby insects may be attracted to the belt, a suction fan whose inlet communicates with the housing interior, a removable receptacle into which the fan discharges, a shaft rotatable within said receptacle, a plurality of vanes fast upon said shaft, upon which the discharge from the fan impinges, substantially as described, and means actuating the travel of the belt and the rotation of the fan.

6. In a device of the character described, the combination with a supporting base, of a frame mounted thereupon, a pair of rollers rotatable in said frame, a traveling belt mounted on said rollers, a housing covering a portion of said belt, a plate projecting from the lower portion of the housing over the belt, a plurality of flaps carried upon said belt, adapted to contact with said projecting plate and thereby form closures to the housing interior, means whereby insects may be attracted to the belt, a suction fan, the inlet of which communicates with the housing interior, a removable receptacle into which the fan discharges, a shaft rotatable within said receptacle, a plurality of vanes fast upon said shaft, upon which the discharge from the fan impinges, means by which the insects caught are disinfected, and means actuating the travel of the belt and the rotation of the fan.

In testimony whereof I have signed my name to this specification in the presence of two subscribing witnesses.

JESSE R. TRUELOVE.

Witnesses:
E. S. MASSENGILL,
W. C. BARBER.